(12) United States Patent
Korach et al.

(10) Patent No.: US 8,672,043 B2
(45) Date of Patent: Mar. 18, 2014

(54) ENCLOSED COILED TUBING BOAT AND METHODS

(75) Inventors: Donovan Korach, Anchorage, AK (US); Drew Byers, Anchorage, AK (US)

(73) Assignee: Nabors Alaska Drilling, Inc., Anchorage, AK (US)

( * ) Notice: Subject to any disclaimer, the term of this patent is extended or adjusted under 35 U.S.C. 154(b) by 397 days.

(21) Appl. No.: 12/938,820

(22) Filed: Nov. 3, 2010

(65) Prior Publication Data

US 2012/0103633 A1 May 3, 2012

(51) Int. Cl.
*E21B 19/00* (2006.01)
*E21B 19/22* (2006.01)

(52) U.S. Cl.
USPC .......................... 166/385; 166/77.2; 166/901

(58) Field of Classification Search
USPC ........ 166/385, 77.2, 901; 29/402.01; 405/211
See application file for complete search history.

(56) References Cited

U.S. PATENT DOCUMENTS

| | | | |
|---|---|---|---|
| 3,626,836 A | 12/1971 | Schneidler | |
| 3,628,521 A | 12/1971 | Hodges | |
| 3,841,407 A | 10/1974 | Bozeman | |
| 4,208,158 A | 6/1980 | Davies et al. | |
| 4,249,600 A | 2/1981 | Bailey | |
| 4,613,001 A | 9/1986 | Edberg et al. | |
| 4,762,185 A | 8/1988 | Simpson | |
| 4,899,823 A | 2/1990 | Cobb et al. | |
| 4,899,832 A | 2/1990 | Bierscheid, Jr. | |
| 5,125,857 A | 6/1992 | Mochizuki | |
| 5,248,005 A | 9/1993 | Mochizuki | |
| 5,411,085 A | 5/1995 | Moore et al. | |
| 5,738,173 A | 4/1998 | Burge et al. | |
| 5,823,267 A | 10/1998 | Burge et al. | |
| 5,842,530 A | 12/1998 | Smith et al. | |
| 6,003,598 A | 12/1999 | Andreychuk | |
| 6,017,082 A | 1/2000 | Leoni | |
| 6,230,805 B1 | 5/2001 | Vercaemer et al. | |
| 6,273,188 B1 | 8/2001 | McCafferty et al. | |
| 6,408,955 B2 | 6/2002 | Gipson | |
| 6,457,520 B2 | 10/2002 | Mackenzie et al. | |
| 6,457,534 B1 | 10/2002 | Rolovic et al. | |
| 6,502,641 B1 | 1/2003 | Carriere et al. | |
| 6,536,539 B2 | 3/2003 | Merecka et al. | |
| 6,554,075 B2 * | 4/2003 | Fikes et al. ................. | 166/379 |

(Continued)

FOREIGN PATENT DOCUMENTS

| | | |
|---|---|---|
| WO | WO 2007/129899 | 11/2007 |
| WO | WO 2008/137914 | 11/2008 |
| WO | WO 2009/023042 | 2/2009 |

OTHER PUBLICATIONS

Gantt et al., "Coiled Tubing Drilling on the Alaskan North Slope," *Oilfield Review*, pp. 20-35 (Summer 1998).

(Continued)

*Primary Examiner* — David Andrews
*Assistant Examiner* — Michael Wills, III
(74) *Attorney, Agent, or Firm* — Haynes and Boone, LLP (57) ABSTRACT

An apparatus including a coiled tubing unit coupled to a drilling rig, and an enclosure surrounding the coiled tubing unit. The coiled tubing unit may include a coiled tubing reel and a coiled tubing injector, wherein the injector may move relative to the coiled tubing reel. The coiled tubing unit is configured to move relative to the drilling rig in both longitudinal and lateral directions.

21 Claims, 8 Drawing Sheets

(56) References Cited

U.S. PATENT DOCUMENTS

| | | | |
|---|---|---|---|
| D483,299 S | 12/2003 | McCafferty et al. | |
| 6,672,407 B2 * | 1/2004 | Streich | 175/58 |
| 6,763,890 B2 | 7/2004 | Polsky et al. | |
| 6,971,457 B2 | 12/2005 | Baird | |
| 7,185,708 B2 | 3/2007 | Wood et al. | |
| 7,255,180 B2 | 8/2007 | Beato et al. | |
| 7,410,327 B2 | 8/2008 | Baugh et al. | |
| 7,469,755 B2 * | 12/2008 | Borst et al. | 175/172 |
| 7,798,237 B2 | 9/2010 | Korach et al. | |
| 7,806,628 B2 * | 10/2010 | Willis | 405/166 |
| 2001/0015274 A1 | 8/2001 | Gipson | |
| 2002/0029907 A1 | 3/2002 | Carriere et al. | |
| 2003/0098150 A1 | 5/2003 | Andreychuk | |
| 2004/0182574 A1 | 9/2004 | Adnan et al. | |
| 2006/0000619 A1 | 1/2006 | Borst et al. | |
| 2006/0207767 A1 | 9/2006 | Andreychuk | |
| 2006/0257258 A1 | 11/2006 | Zwebner | |
| 2006/0260844 A1 | 11/2006 | Patton et al. | |
| 2006/0283587 A1 | 12/2006 | Wood et al. | |
| 2007/0125551 A1 | 6/2007 | Havinga | |
| 2007/0221386 A1 | 9/2007 | Rock et al. | |
| 2007/0284113 A1 | 12/2007 | Haheim | |
| 2008/0173480 A1 | 7/2008 | Annaiyappa et al. | |
| 2008/0185184 A1 | 8/2008 | Maguire | |
| 2009/0025980 A1 | 1/2009 | Callander et al. | |
| 2009/0056953 A1 | 3/2009 | Korach et al. | |
| 2010/0038088 A1 | 2/2010 | Springett et al. | |

OTHER PUBLICATIONS

Cassee et al., "True Hybrid Operations Combining Coiled Tubing Drilling and Conventional Rig Workover Techniques and Practices," *Reel Reporter*, Newsletter of the International Tubing Association, vol. 9, Issue 2, pp. 2-9 (May 2004).

* cited by examiner

ENCLOSED COILED TUBING BOAT AND METHODS

BACKGROUND

Coiled tubing drilling offers the advantages of reduced time and costs associated with conventional drilling operations that utilize segmented pipe. These advantages include reduced pipe handling time, reduced pipe joint makeup time, and reduced leakage risks.

When coiled tubing drilling is utilized, however, conventional drilling may still be required to drill surface holes due to the lack of bit weight at the surface with coiled tubing drilling. A separate conventional drilling rig is then required to drill a surface hole, place surface casing, cement, and then drill to deeper depths. Thus, hybrid rigs exist that can perform both conventional drilling and coiled tubing drilling.

Hybrid rigs, however, are often utilized in extremely cold environments, such as Alaska. These rigs typically feature a fixed coiled-tubing-reel location, which is cumbersome and difficult to position and operate, particularly in extremely cold environments. Moreover, the entire coiled tubing unit (e.g., reel and injector) is exposed to the cold environment, and can be subject to freeze-up or other weather-induced failure.

One recent advance in the field of coiled tubing rigs is discussed in co-pending U.S. patent application Ser. No. 11/847,437, filed Aug. 30, 2007. That document discloses an apparatus including a mobile trailer, a coiled tubing unit coupled to the mobile trailer, and an enclosure surrounding the coiled tubing unit, which coiled tubing unit may include a coiled tubing reel and a coiled tubing injector. The reel and the injector may be positionally fixed relative to one another and collectively move relative to the mobile trailer as an integral unit.

Additionally, the number and availability of hybrid rigs is low. Major modification or re-design of existing rigs configured for drilling with segmented pipe is typically required to add the capability to drill with coiled tubing. This modification or re-design of existing rigs is expensive and takes a long time. Thus, there remains a need for improved coiled tubing rig equipment and drilling methods.

SUMMARY OF THE INVENTION

The invention encompasses an enclosed coiled tubing boat apparatus, including a structural framework, a coiled tubing reel and an operatively associated coiled tubing injector, and an enclosure that is operatively associated with the structural framework and that surrounds a portion of the coiled tubing reel and the coiled tubing injector to form the coiled tubing boat apparatus, wherein the coiled tubing injector is configured to move within the coiled tubing boat apparatus and wherein the structural framework is adapted for installation and operative association with a drilling rig.

In one embodiment, the coiled tubing boat apparatus is movably coupled to the drilling rig and the coiled tubing boat apparatus is configured to move in at least two dimensions relative to the drilling rig. In a preferred embodiment, the coiled tubing boat apparatus is coupled to a structural member layout on the drilling rig. In another preferred embodiment, the coiled tubing boat apparatus is adapted to move between a non-operating, coiled tubing reel exchange position and an operating position, each on the drilling rig. In a more preferred embodiment, the non-operating coiled tubing reel exchange position includes a portion of the coiled tubing boat apparatus overhanging a rear of the drilling rig. In yet another preferred embodiment, the operating position includes the coiled tubing boat apparatus positioned proximate the mast of the drilling rig. In a more preferred embodiment, the coiled tubing boat apparatus is adapted to move to a non-operational rig transport location in which the coiled tubing apparatus is adapted to move laterally relative to the drilling rig to facilitate lowering of the mast of the drilling rig to an at least substantially horizontal position. In another embodiment, the coiled tubing boat apparatus further includes a driller's cabin that includes a plurality of controls to at least operate the coiled tubing injector, and hoist and lower a block of the drilling rig.

The invention further encompasses a method of modifying an existing drilling rig which includes installing a plurality of structural members on the existing drilling rig; providing a coiled tubing boat apparatus which includes a structural framework adapted to be associated with the plurality of structural members, an enclosure surrounding at least a portion of the structural framework, a coiled tubing reel, and a coiled tubing injector; wherein the coiled tubing injector moves between a non-operational position within the coiled tubing boat apparatus and an operational position; and operatively associating the coiled tubing boat apparatus with the plurality of structural members so that the coiled tubing boat apparatus may move relative to the drilling rig.

The invention also encompasses a method of operating a drilling rig by providing a plurality of structural members on the drilling rig, providing a coiled tubing boat apparatus which includes a structural framework adapted to be associated with the plurality of structural members, operatively associating the coiled tubing boat apparatus with the plurality of structural members so that the coiled tubing boat apparatus may move relative to the drilling rig, and moving a coiled tubing boat apparatus between an operating position and a non-operational, coiled-tubing-reel exchange position on the drilling rig.

In one embodiment, moving the coiled tubing boat apparatus to the coiled-tubing-reel exchange position includes moving the coiled tubing boat apparatus so that a portion of the coiled tubing apparatus overhangs a rear of the drilling rig. In another embodiment, moving the coiled tubing boat apparatus to the operating position includes moving the coiled tubing boat apparatus proximate a mast of the drilling rig. In yet a further embodiment, the method further includes moving the coiled tubing boat apparatus laterally relative to the drilling rig to facilitate lowering of a mast of the drilling rig to be lowered to at least a substantially horizontal position. In still a further embodiment, the method further includes controlling a coiled tubing injector and hoisting and lowering of a block of the drilling rig from a driller's cabin in the coiled tubing boat apparatus.

The invention also encompasses a coiled tubing boat apparatus including an operatively associated coiled tubing reel and coiled tubing injector, wherein the coiled tubing injector is configured to move relative to the coiled tubing reel, an enclosure surrounding at least a portion of the coiled tubing reel and coiled tubing injector to form the coiled tubing boat apparatus, wherein the coiled tubing boat apparatus is integrally coupled with an existing drilling rig and configured to translate in at least two dimensions relative to the drilling rig.

In one embodiment, the at least two dimensions includes longitudinal and lateral movement relative to the drilling rig. In another embodiment, the coiled tubing boat apparatus is supported by a structural framework that is operatively associated with a plurality of structural members connected to the drilling rig, wherein the coiled tubing boat is installed on the plurality of structural members. In yet a further embodiment, the coiled tubing boat apparatus is adapted to translate longitudinally relative to the drilling rig so that a portion of the coiled tubing boat apparatus overhangs a rear of the drilling rig in a non-operational position. In still another embodiment, the coiled tubing boat apparatus further includes a driller's cabin that includes a plurality of controls to at least operate the coiled tubing injector, and hoist and lower a block of the drilling rig.

It should be understood that various embodiments described herein can be combined or substituted in various ways to form additional embodiments according to the invention.

BRIEF DESCRIPTION OF THE DRAWINGS

The present disclosure can be better understood from the following detailed description when read in association with the accompanying figures described below. It is emphasized that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENTS

It is to be understood that the following disclosure provides many different embodiments, or examples, for implementing different features of various embodiments. Specific examples of components and arrangements are described below to simplify the discussion below. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact unless specifically stated to be so.

The invention generally provides an integrated coiled tubing reel, injector, and cart in the form of a coiled tubing boat or skid, which is at least partially, preferably entirely, enclosed to adapt it for Arctic or other cold-weather operation, along with an operably coupled guide system for longitudinal and lateral movement of the coiled tubing boat relative to a drilling rig. The term "guide" or "guide system" may also be referred to herein as a "track" or "track system." The coiled tubing boat and guide system can be provided on new rigs or existing rigs can be modified and adapted to include a guide system that can accommodate the coiled tubing boat as described herein. The coiled tubing boat system can advantageously permit modification of existing rigs without major modification or re-design of the drilling rig.

The coiled tubing boat is preferably pre-manufactured and assembled in the modification embodiment, such that an existing rig can be readily modified by adding the guide system and optional jacking system, and providing the coiled tubing boat in operative association therewith to the guide. The longitudinal and lateral movement of the coiled tubing boat relative to the drilling rig allows for easy replacement of the coiled tubing reel, adjustment of the weight and balance of the drilling rig (along with operation of the optional jacking system when present), and also allows the mast of the drilling rig to be lowered to at least a substantially horizontal position on the rig when desired, such as for rig relocation. In another embodiment, a rig may be initially arranged or even integrally formed with a coiled tubing boat according to the invention.

The coiled tubing boat advantageously includes/provides a rapidly addable framework that facilitates replacement of the coiled tubing unit or any other components that require repair or replacement, which can now be done off-line while a replacement coiled tubing boat is substituted in as a replacement on the rig. This can advantageously expedite the assembly and disassembly speed for replacement and repairs because, e.g., the blowing down of the coil, disconnecting of various pieces in the boat, and other tasks required to swap out a coiled tubing unit are advantageously minimized or eliminated during the replacement operation to help limit rig downtime. Advantageously, the modification of an existing rig can be easily accomplished by adding the guide and optional jacking system, and providing the coiled tubing boat in operative association therewith to the guide. The inventive coiled tubing boat can also advantageously permit the mast to be lowered without interference from the coiled tubing unit.

Figure 1:
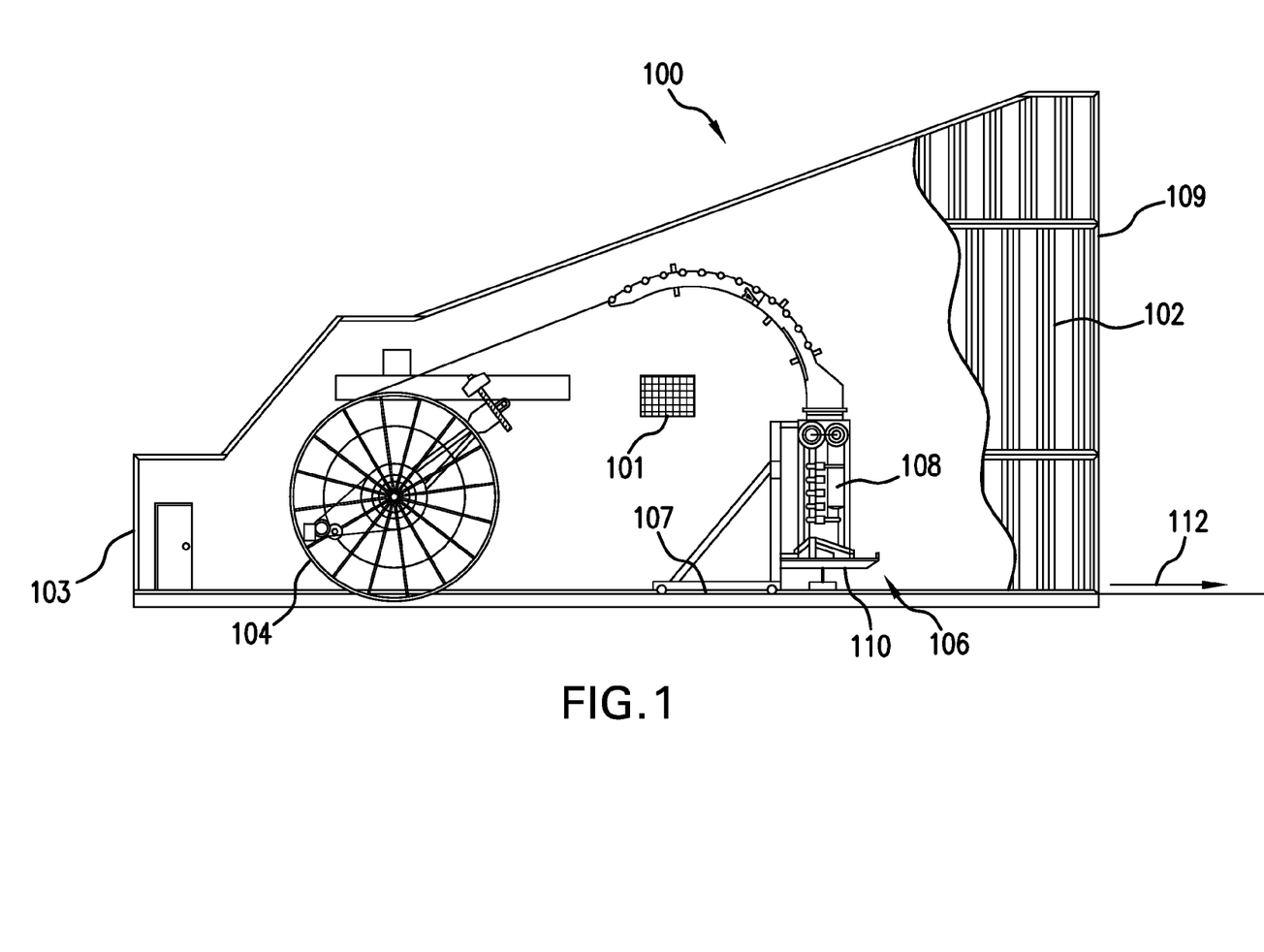
FIG. 1 is a partial side view of a coiled tubing boat according to an embodiment of the present invention.

FIG. 1 is a side view of an embodiment of a coiled tubing boat 100 according to one or more aspects of the present disclosure. The coiled tubing boat 100 may be a pre-manufactured skid system designed to be installed onto a layout of structural members that is installed on an existing drilling rig. The structural members may also be pre-manufactured and installed to fit a particular existing rig. In one embodiment, the skid system and structural members can even be pre-manufactured in association with each other, such as the structural members including one or more tracks in which the skid system can be or is disposed. The track(s) can, in a preferred embodiment, partially or completely enclose a portion of the skid system to slidably retain it. The pre-manufacturing allows coiled tubing drilling capability to be added to existing segmented pipe drilling rigs without major modifications. Thus, a pre-manufactured skid system can allow quicker and less expensive modification of existing rigs. The present disclosure may also be used on newly designed rigs that are to be designed or manufactured. By "drilling rig" it should be understood that any wellsite operation is encompassed, including oil or gas, as well as pipe drilling or casing running.

The coiled tubing boat 100 is preferably fully enclosed within an enclosure or exterior wall 102, or otherwise protected from the cold and harsh elements associated with Arctic-type rig operations. Being fully enclosed within the exterior wall 102, for example, allows drilling equipment and other components of the coiled tubing boat 100 to more easily be maintained at an adequate temperature and, thereby, minimize or eliminate "freeze up", as well as metal fatigue, cracking, and other similar equipment problems that can occur in Arctic-type environments or in environments with extreme temperature cycling. Positioning the coiled tubing reel within a protected enclosure can advantageously provide an added benefit of avoiding blow down of the coil to remove excess fluid after operations, since the coil will remain above freezing in the protected enclosure. Blow down of the coil to remove excess fluid from the coiled tubing (CT) may still be required when changing the coil, e.g., for safety or environmental reasons. For example, the exterior wall 102 shields the interior of the coiled tubing boat 100 from wind and other harsh elements of cold environments, and may also help to prevent the escape of any thermal energy generated inside the interior of the coiled tubing boat 100, such as from one or more heaters 101. For example, the coiled tubing boat 100 may include one or more about 2.5 MM BTU heaters each operable at 20 gal/hr. One or more less powerful heaters (e.g., about 0.5 MM to about 1 MM BTU heaters) can be used if additional heating locations or granularity in total heating capacity is desired. The one or more heaters 101 may be configured to maintain the internal temperature of the coiled tubing boat 100, internal to the exterior wall 102, at or above a minimum temperature. For example, the minimum temperature may be about 34° F. to 45° F., typically about 40° F., although other temperatures are also within the scope of the present disclosure.

Alternatively, the exterior wall 102 may shield the interior of the coiled tubing boat 100 from other weather elements in environments other than cold environments, such as by protecting the interior of the coiled tubing boat 100 from sand or other airborne debris which may exist in warmer environments (e.g., the desert).

Still referring to FIG. 1, in this example, the coiled tubing boat 100 includes a coiled tubing reel 104 and a coiled tubing injector assembly 106. The coiled tubing injector assembly 106 includes a coiled tubing injector 108 and a coiled tubing injector cart 110. The coiled tubing injector cart 110 is configured to retain the coiled tubing injector 108 and to travel along the longitudinal axis 112 of the coiled tubing boat 100 between a rig mast and the coiled tubing reel 104. The coiled tubing injector cart 110 may travel along the longitudinal axis by the use of rolling element(s) (including but not limited to cylinders, wheels, balls, or any other suitable rollable shape), low-friction surfaces, or other device(s) to facilitate relative motion between the coiled tubing injector cart 110 and the coiled tubing boat 100 that is available to those of ordinary skill in the art. In a preferred embodiment, the rolling element(s), low-friction surfaces, or other longitudinal movement mechanism may be operatively associated with a track, a rail, trailer, or another elongated guide of any suitable type available to those of ordinary skill in the art to facilitate longitudinal movement of the coiled tubing boat 100 along the longitudinal axis of the drilling rig (not shown in FIG. 1). The use of the term "guide" herein refers to any type of mechanism to promote movement of the coiled tubing boat.

The guide system may be pre-manufactured based on dimensions of existing rig specifications, and then assembled in advance and then rapidly disposed into place right onto an existing drilling rig surface without need for lengthy interference with drilling operations. In this example, the coiled tubing boat 100 includes a coiled tubing injector assembly 106 that travels on a plurality of wheels (not enumerated) associated with structural rails 107 that extend at least substantially along the length of the coiled tubing boat 100 from the drilling end 109 of the coiled tubing boat 100 to proximate the coiled tubing reel 104.

In an exemplary embodiment, the coiled tubing reel 104 may include a coiled tubing reel system manufactured by Foremost Industries. In an exemplary embodiment, the coiled tubing injector assembly may include a coiled tubing injector M100 made by Stewart and Stevenson. The movement of the coiled tubing injector assembly 106 within the coiled tubing boat 100 allows the weight of the coiled tubing boat 100 to be balanced for when the coiled tubing boat 100 needs to be moved, as described in more detail below, and facilitates the proper positioning of the coiled tubing injector 108 and the coiled tubing reel 104 relative to each other, such as for spooling purposes and to help maintain the proper angle and tension between the coiled tubing injector 108 and the coiled tubing reel 104.

Figure 2:
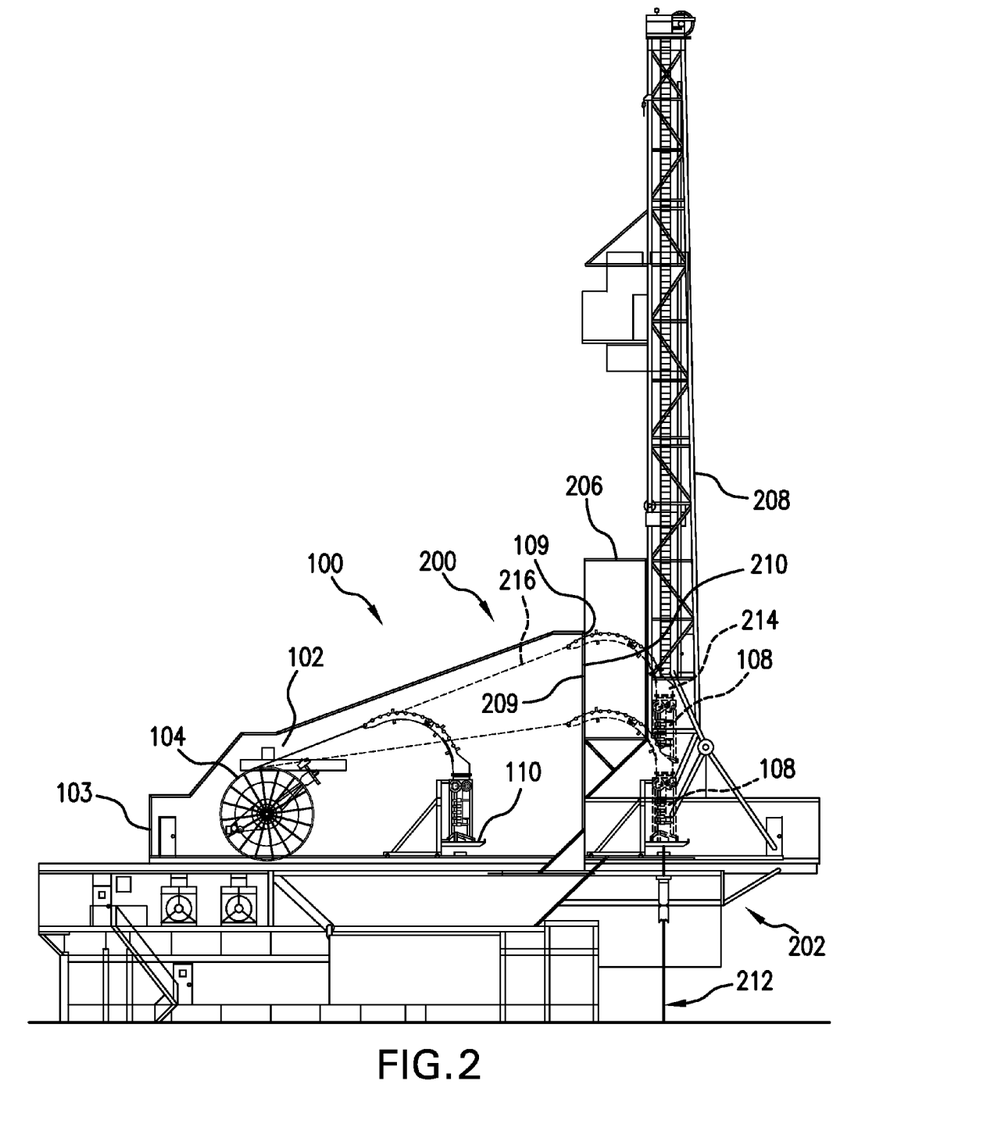
FIG. 2 is a side view of a coiled tubing boat of FIG. 1 in an operational position on a drilling rig according to an embodiment of the invention.

FIG. 2 is a side view of an example of a coiled tubing boat 100 located in an operational position 200 on a drilling rig 202, i.e., a position from which coiled tubing operations will be conducted. Drilling rig 202 may be a hybrid coiled tubing and segmented pipe drilling rig that is known to be useful in operation in Arctic environments. In the operational position 200, in this example, the coiled tubing boat 100 is located so that the drilling end 109 opposite the coiled tubing reel 104 of the coiled tubing boat 100 is proximate a wind wall 206 that at least partially surrounds the mast 208 of the drilling rig 202. The drilling rig 202 is further configured to allow the coiled tubing injector cart 110 to travel along the drilling rig 202 between the drilling end 109 of the coiled tubing boat 100 to over well center 212. The wind wall 206 is configured to allow an openable area 210 in the wind wall 206 to open and allow the coiled tubing injector cart 110 to travel within the confines of the wind wall 206. Likewise, the exterior wall 102 is configured to allow an openable area 209 to open and allow the coiled tubing injector cart 110 to travel from the coiled tubing boat 100 to the drilling rig 202. The openable areas 209 and 210 may close to retain heat in situations when the coiled tubing boat 100 moves away from the wind wall 206 or when the rig is otherwise not in operation such that the cart 110 need not be over well center.

Still referring to FIG. 2, in this example, once the coiled tubing injector cart 110 has positioned the coiled tubing injector 108 sufficiently over well center 212, the coiled tubing injector 108 may be raised to an elevated position 214 along the mast 208 to conduct various coiled tubing activities, such as insertion of the bottom hole assembly (BHA). This operation is well known to those of ordinary skill in the art. In the elevated position 214, the coiled tubing injector 108 is disposed within the confines of the wind wall 206 and the coiled tubing 216 is also disposed within the enclosure of the exterior wall 102 of the coiled tubing boat 100.

Figure 3:
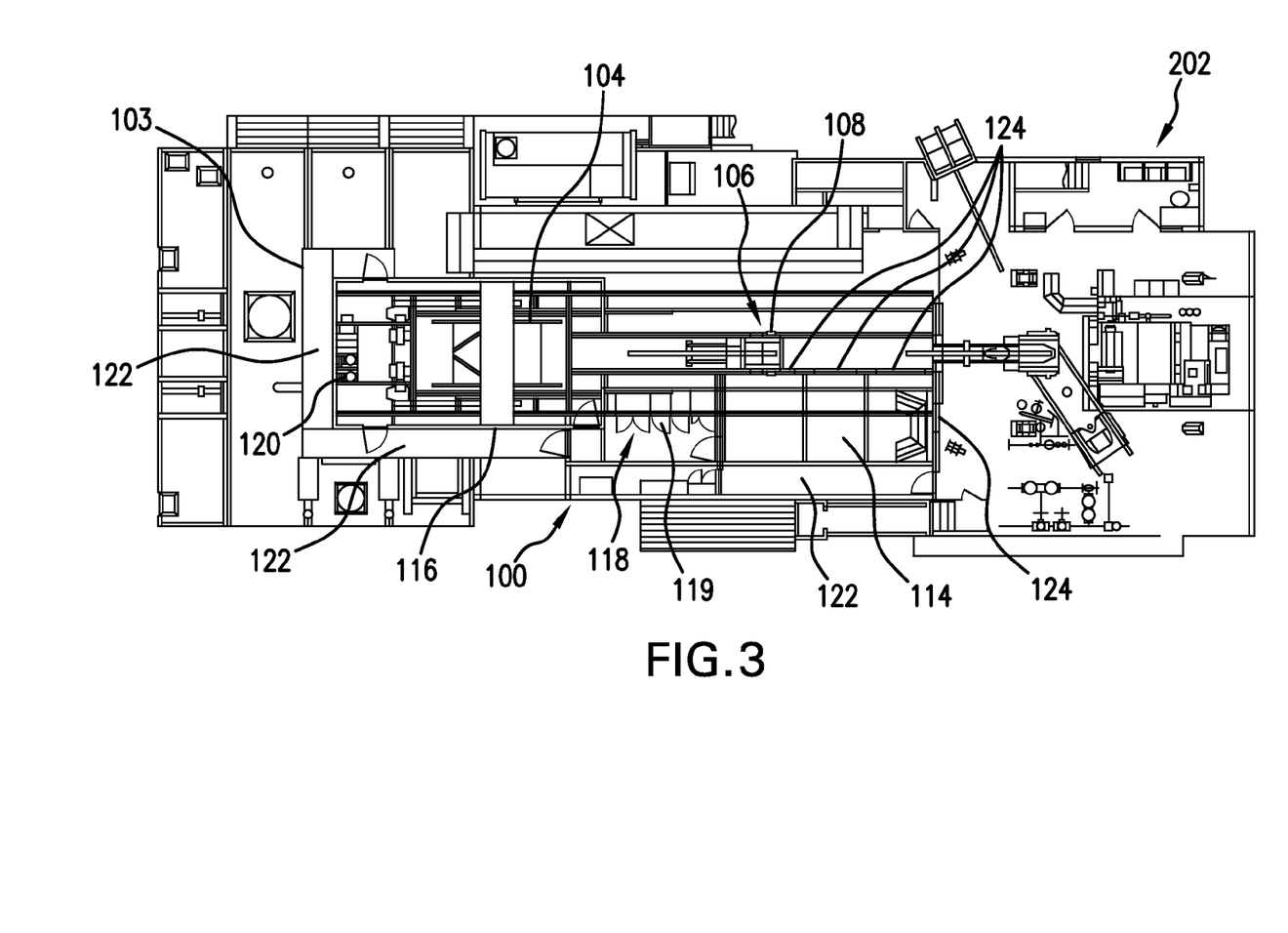
FIG. 3 is partial plan view of the apparatus shown in FIG. 2 according to an embodiment of the invention.

FIG. 3 is a partial plan view of an embodiment of a coiled tubing boat 100 illustrating various preferred components that may be located within the coiled tubing boat 100. In addition to the coiled tubing reel 104 and the coiled tubing injector assembly 106, the coiled tubing boat 100 may include a driller's cabin 114, a lift system 116 (e.g., without limitation, an about 40-ton, about 50-ton, or about 60-ton system)

for raising and lowering the coiled tubing reel 104 up into the enclosure or down below the enclosure for exchange of a coiled tubing reel 104 with a replacement. Also, various types of electrical equipment 118 and hydraulic equipment 120 may be included for operation and control of the coiled tubing reel 104 and injector assembly 106, although other configurations of the features depicted in FIG. 3 are also within the scope of the present disclosure. For example, the electrical equipment 118 may include a motor control center 119. The motor control center 119 may include variable frequency drive technology to provide variable AC power to the drilling and support machinery. The motor control center 119 may also include the ability to use incoming electrical power, such as incoming 13.8 kV power, when available. The coiled tubing boat may be designed with walkways 122, which may or may not be enclosed within the exterior wall 102, to facilitate operations. Windows 124 in the driller's cabin 114, when included as depicted, allow a view of the coiled tubing injector cart 106 such as when it travels within the coiled tubing boat 100 and when it is located within the drilling rig 202.

In an exemplary embodiment, the driller's cabin 114 may provide a calm environment for one or more operators to work by reducing noise levels and providing machinery automation. The coiled tubing injector 108 push/pull and block hoisting/lowering may be controlled by a joystick or other human-machine interface from within the cabin 114.

Quality of work and important decision making can thus be improved in this atmosphere. The console and other control panels within the driller's cabin 114 are preferably configured to allow personnel to complete regular shifts while minimizing stress and strain, despite the harsh environment outside of the cabin 114. Operational controls and parameters, such as hook load, block height, speed and rate of penetration (ROP), as well as status and alarms and a variety of other drilling operations, may be accessed via touch screens connected to the drilling control network in the cabin 114. The control system may include one or more of the following features configured to help the driller optimize efficiency and safety of operation, including: coiled tubing tension minimum and maximum set points; coiled tubing stress analysis and life management; managed pressure choke control; block position limits (crown saver and floor saver); block speed limits (safety limits, swab, surge and casing speed); driller's set points (stopping positions); over-pull limits and snubbing limits; drilling and tripping process screens; pit volume, flow, and pit valve control. The electronic drilling control algorithms help drillers significantly reduce drilling costs and improve rig safety. Superior drilling performance may thus be achieved by increased precision in monitoring or maintaining at least one of four parameters simultaneously: weight on bit (WOB), ROP, drilling torque and delta-P (differential downhole motor pressure), or any combination thereof. These design features may provide consistent, steady-state control at the drill bit, which may result in longer bit life, optimum bit performance, reduced bit usage and reduced bit trips. This system may also help improve directional drilling control and accuracy.

Figure 4:
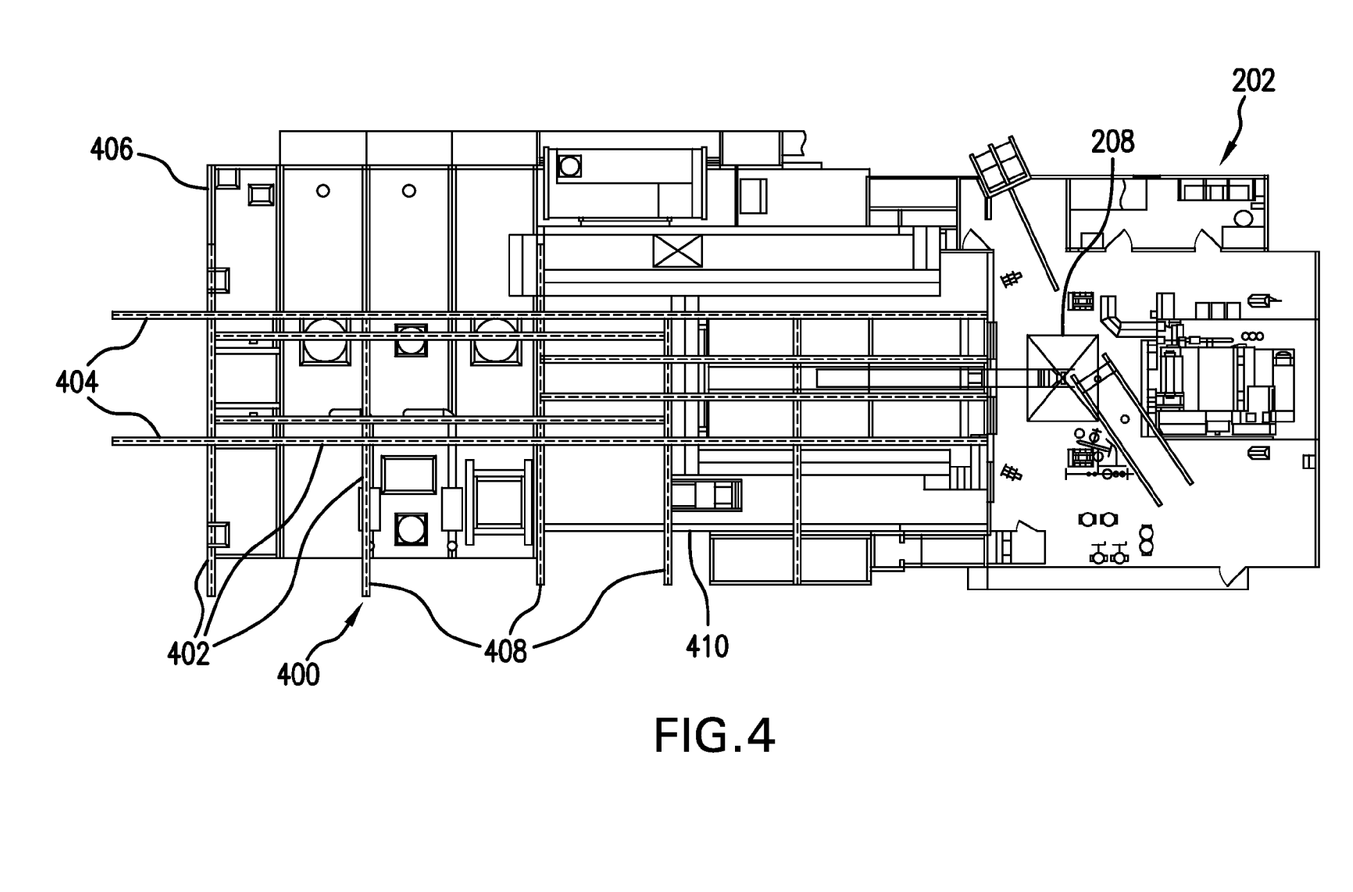
FIG. 4 is a partial plan view of a layout of structural members on a drilling rig according to an embodiment of the invention.

FIG. 4 is a plan view of an example of a layout 400 showing a plurality of structural members 402 that may be located on drilling rig 202 to allow drilling rig 202 to receive and laterally transfer the coiled tubing boat 100 (not shown in FIG. 4). Structural members 402 may be, e.g., structural steel channels, I-beams, or other structural members having sufficient rigidity and strength so as to be adapted to support the weight and movement of the coiled tubing boat 100. Any suitable material, e.g., stainless steel, aluminum or an alloy thereof, etc., and any suitable arrangement of structural members may be used by those of ordinary skill in the art based on the guidance provided herein. Layout 400 includes a pair of rear members 404 that extend past the back end 406 of the drilling rig 202 opposite the mast 208. As will be explained in greater detail below, rear members 404 facilitate movement of the coiled tubing boat 100 relative to the drilling rig 202 so that a rear end 103 of the coiled tubing boat 100 can overhang the back end 406 of the drilling rig 202 (see FIG. 7 and associated discussion). This advantageously can permit the coiled tubing reel 104 to be lowered to the ground when it is necessary to exchange the coiled tubing reel 104. In this example, a pair of rear members 404 are illustrated, however, any suitable number of rear members 404 could be used that allows the function of exchanging the coiled tubing reel 104. In one embodiment (not shown), the rear members 404 can be sloped from the back end 406 of the drilling rig 202 downwards to the ground to facilitate lowering of the coiled tubing reel 104.

A plurality of side members 408 of layout 400 are advantageously included and extend to at least one side of the drilling rig 202, and may extend past the side 410 of drilling rig 202. As further explained below, side members 408 facilitate movement of the coiled tubing boat 100 relative to the drilling rig 100, thereby permitting the coiled tubing boat 100 to move laterally relative to the drilling rig 202 so that the mast 208 may be lowered in a horizontal direction, and preferably to an at least substantially, or preferably entirely, lowered horizontal position on the drilling rig 202, such as, for example, when it is necessary to move the entire drilling rig 202 to a new location. In this example, five side members 408 are illustrated, however, any number of side members 408 could be used that allows the coiled tubing boat 100 to move laterally with respect to the drilling rig 202 to allow the mast 208 to be lowered in that general direction to occupy at least a portion of the location previously occupied by the coiled boat during operation (i.e, in the operational position), and preferably to be lowered to a horizontal position that would not have been possible but for the movement of the coiled tubing boat away from the operational position.

Figure 5:
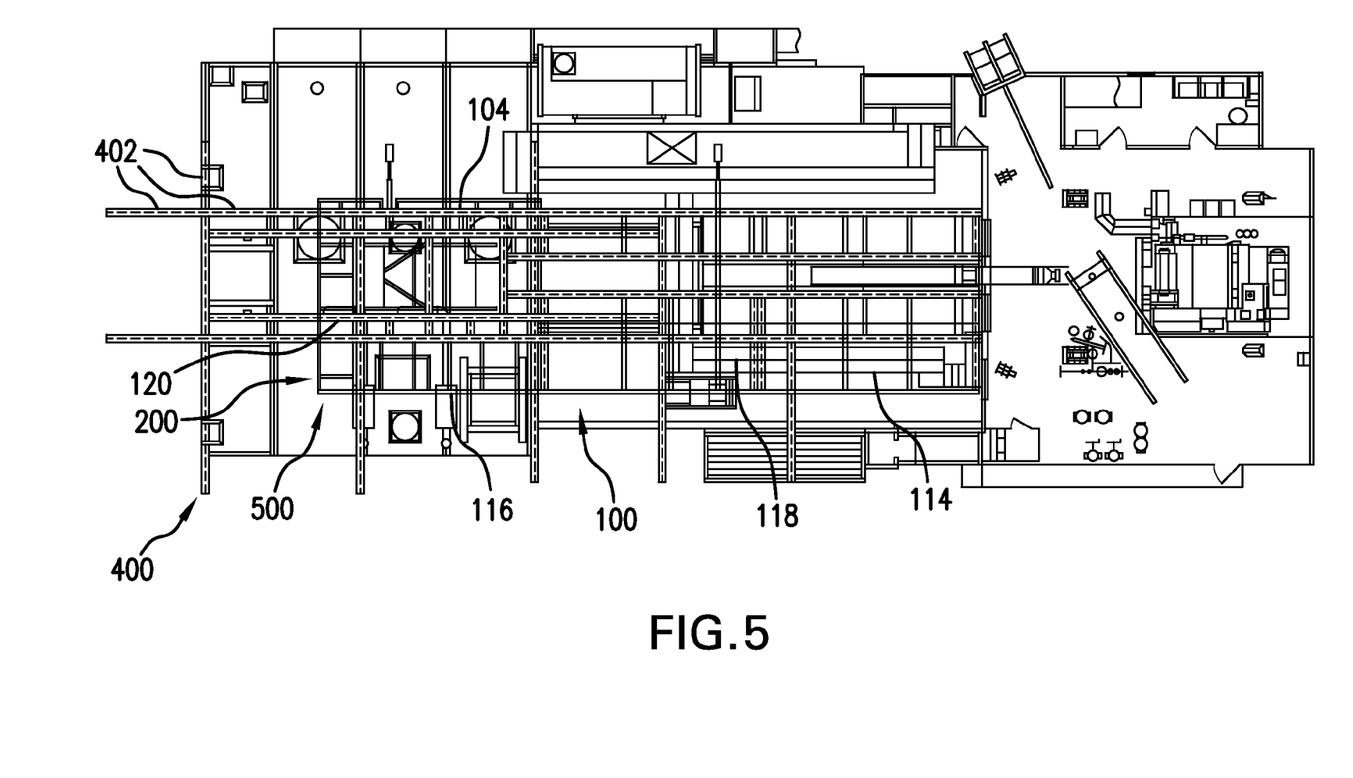
FIG. 5 is a partial plan view of the structural framework of the coiled tubing boat of FIG. 1 in an operational position coupled to the structural members of FIG. 4 according to an embodiment of the invention.

FIG. 5 is a partial plan view of the framework 500 of the coiled tubing boat 100 positioned over the layout 400 of the structural members 402 while the coiled tubing boat is in an operational position 200. Framework 500 may include structural steel channels, I-beams, or other structural members adapted to support the weight and movement of the coiled tubing boat 100 as described above for structural members 402. Framework 500 is preferably adapted to support the desired components of coiled tubing boat 100, including the coiled tubing reel 104 and coiled tubing injector assembly 106, and preferably also the driller's cabin 114, the 50-ton lift system 116, electrical equipment 118, and hydraulic equipment 120. Framework 500 preferably provides sufficient strength and rigidity so that the fully enclosed, integrated package of the coiled tubing boat 100 may be raised by crane, or any other technique available to those of ordinary skill in the art, and installed on top of the layout 400 on top of the drilling rig 202.

Although not depicted, it should be understood that a jacking system can be preferably included and operably associated with the coiled tubing boat to facilitate the shifting of the boat's weight and to assist with balancing the overall weight on the drilling rig 202. This jacking system can be adapted, for example, to lift or lower one, two, three, or even four points on the structural members 402 the same or independently varying amounts, such as at four opposite corners of the boat, which can assist in shifting the weight and balance of the coiled tubing boat to minimize the risk of rig tipping, to facilitate lateral or longitudinal movement of the boat, or otherwise to streamline drilling rig operation.

The coiled tubing boat may then be seen to move in three dimensions. The coiled tubing boat may move in two at least substantially, or preferably entirely, horizontal directions laterally and longitudinally relative to a drilling rig or the remainder of a drilling rig. The coiled tubing boat may also move in a third, vertical dimension relative to the rig by the use of the jacking system when present.

Figure 6:
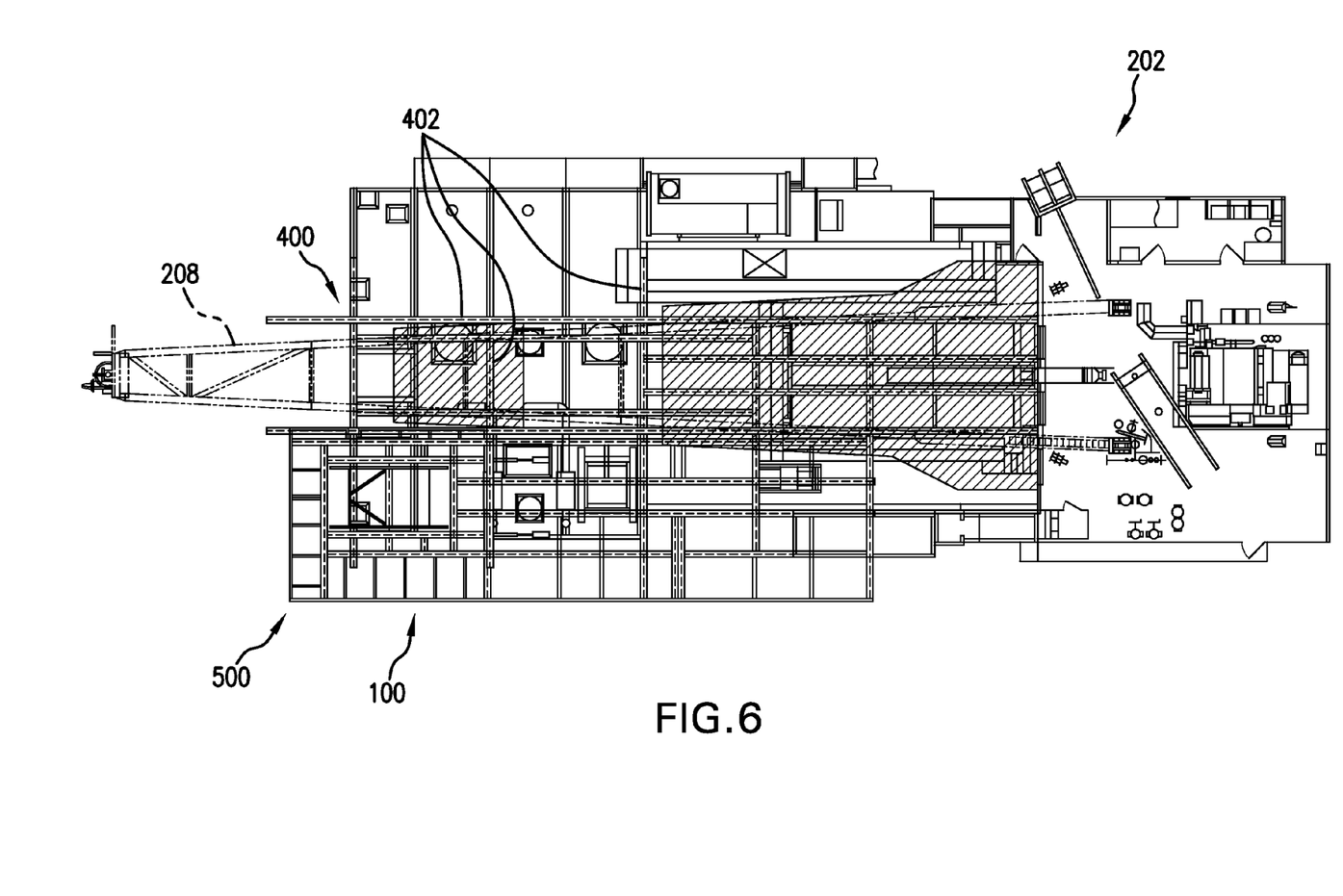
FIG. 6 is another partial plan view of the structural framework of the coiled tubing boat of FIG. 1 coupled to the structural members of FIG. 4 according to an embodiment of the invention.

FIG. 6 is a partial plan view of the framework 500 of the coiled tubing boat 100 positioned over the layout 400 of the structural members 402 while the coiled tubing boat 100 is in a side position on the drilling rig 202 with the mast 208 in a horizontal position on the drilling rig 202. The coiled tubing boat 100 may move along the structural members 402 by the use of electric or hydraulic motors, winches, rails, wheels, low-friction surface(s), or any other available mechanism (not shown) allowing relative motion between the coiled tubing boat 100 and the structural members 402 that are known to one of ordinary skill in the art, particularly based on the guidance herein. Furthermore, in this example, it is shown that the coiled tubing boat 100 moves to the right when viewed from the rear of the drilling rig 202, however, moving to the left when viewed from the rear of the drilling rig 202 is also within the scope of the present disclosure. In an exemplary embodiment, the coiled tubing boat 100 travels laterally by the same or a different mechanism as along the track or elongate guide between the rear and mast end of the drilling rig 202. Even if the same mechanism is used, the lateral movement can be independent of the longitudinal movement, for example, by respectively engaging and disengaging the longitudinal movement mechanism and the lateral movement mechanism as needed.

In another embodiment (not shown), the longitudinal and lateral movement mechanisms are the same. In this embodiment, for example, a set of rollers can be associated with a channel or track, and the coiled tubing boat 100 can be moved either longitudinally or laterally along a plurality of lateral supports that are all interconnecting in a grid. For example, a plurality of switches or gates, such as might be used in railroad track, can be opened and closed to help modify the channel or track to facilitate guiding the coiled tubing boat 100 in the desired direction and to the desired location. Thus, the coiled tubing boat 100 can be guided along the longitude, at which point a gate could block further longitudinal travel and a plurality of lateral support guide gates can be opened to permit lateral movement of the coiled tubing boat 100.

Figure 7:
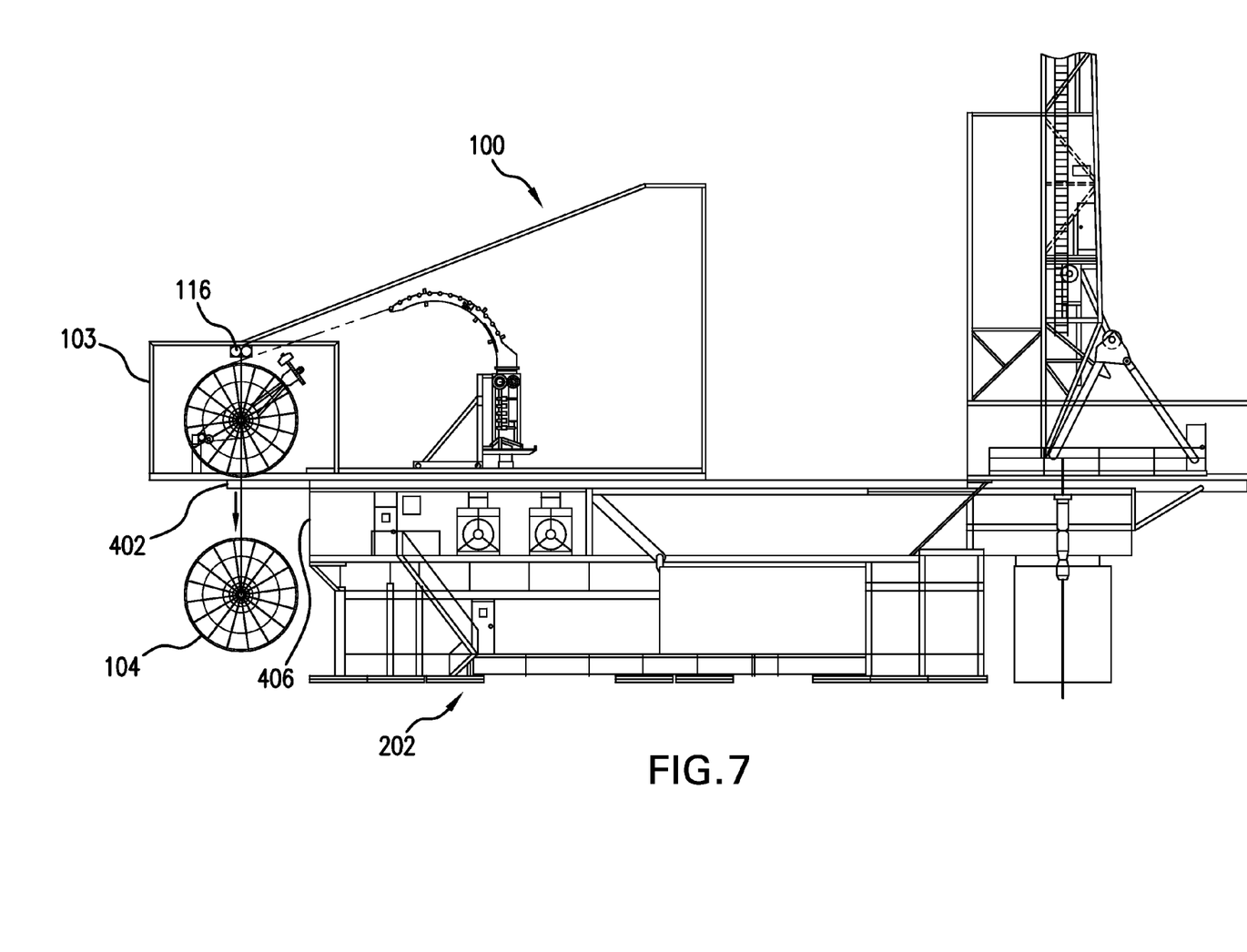
FIG. 7 is a partial side view of a coiled tubing boat of FIG. 1 in a coiled tubing reel exchange position on a drilling rig according to an embodiment of the invention.

FIG. 7 is a partial side view of the coiled tubing boat 100 positioned on a plurality of structural members 402 so that the rear end 103 of the coiled tubing boat 100 overhangs the back end 406 of the drilling rig 202. This can facilitate lowering the coiled tubing reel 104 to the ground with a lift 116 when it is necessary or desired to exchange the coiled tubing reel 104.

Figure 8:
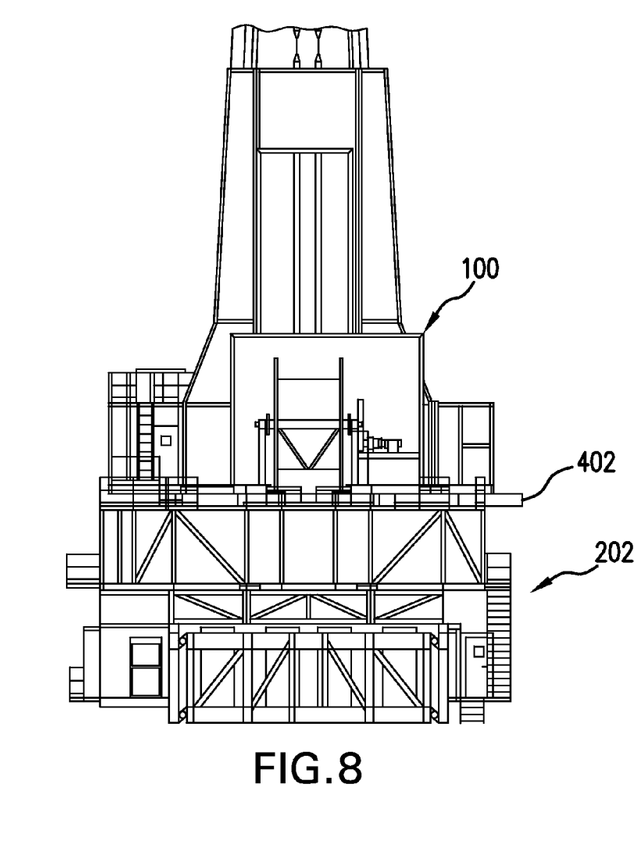
FIG. 8 is an end view from the coiled tubing reel end of a coiled tubing boat of FIG. 1 on a drilling rig according to an embodiment of the invention.
Figure 9:
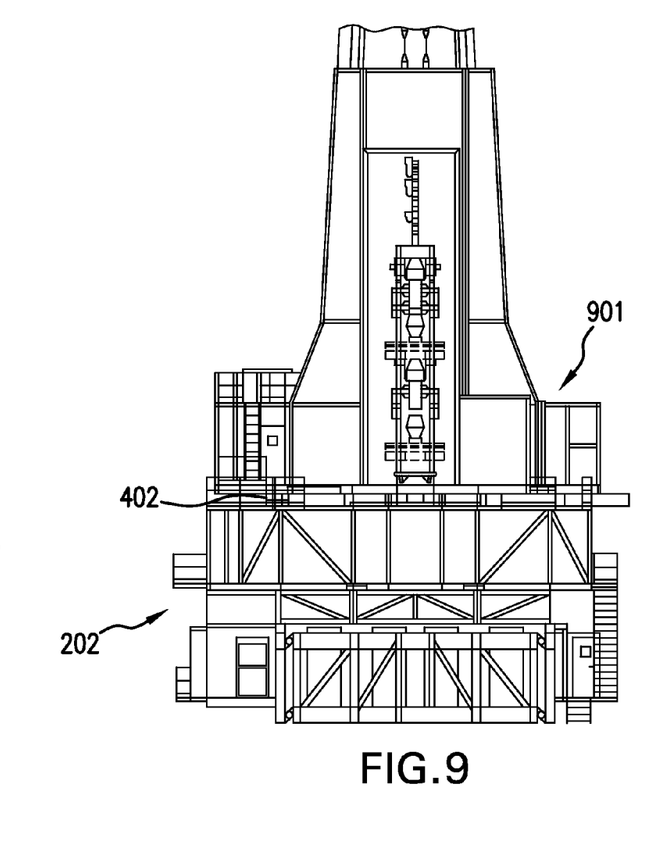
FIG. 9 is an end view from the mast end of a drilling rig of a coiled tubing boat of FIG. 1 on a drilling rig according to an embodiment of the invention.

FIG. 8 is a partial end view of the coiled tubing boat 100 on the drilling rig 202 from the reel end of the coiled tubing boat. FIG. 9 is a partial end view of the coiled tubing boat 100 on the drilling rig 202 from the mast end of the drilling rig 202. Existing drilling rigs may be modified and adapted to contain a doghouse 901 inside of which the driller controls the drilling operations, e.g., electronically (such as with a joystick) or hydraulically, and the doghouse may include the control panel for the rig. The doghouse 901 where the driller can control the apparatus and drilling operations is preferably included as part of the coiled tubing boat in the driller's cabin 114, but in other embodiments, the doghouse 901 can be part of the rig and is only at most operatively associated with the coiled tubing boat.

In view of the above description and the figures, it should be apparent to those of ordinary skill in the art that the present disclosure introduces a coiled tubing boat apparatus including a pre-manufactured, fully integrated, coiled tubing unit and an enclosure surrounding the coiled tubing unit. The coiled tubing unit may include a coiled tubing reel and a coiled tubing injector, wherein the coiled tubing injector may move relative to the coiled tubing unit. The apparatus may further include a track extending at least a portion of the length of the coiled tubing unit, wherein the coiled tubing injector is configured to translate along the track laterally relative to the coiled tubing unit. The apparatus also includes a plurality of structural members that facilitate lateral movement of the coiled tubing boat to permit the mast of the drilling rig to be lowered to at least a substantially horizontal position or an entirely horizontal position, such that the mast occupies at least a portion of a location in which the coiled tubing boat was previously positioned. The enclosure may surround a portion of coiled tubing that extends from the coiled tubing reel to the coiled tubing injector. The apparatus may further include a lifting system configured to transfer the coiled tubing reel from the coiled tubing unit to a ground location to replace the coiled tubing reel, or this lifting system may be separate and operatively associated with the present apparatus when desired. The apparatus may further include a heater coupled to the coiled tubing unit internal to the enclosure, such as one or more 2.5 MM BTU heaters each operable at 20 gal/hr.

The term "about," as used herein, should generally be understood to refer to both numbers in a range of numerals. Moreover, all numerical ranges herein should be understood to include each whole integer within the range.

The term "portion" or "a portion" refers to any portion described, such as a minority, half, majority, at least substantially all, or entirely all of the characteristic described. Preferably, in some embodiments, it refers to at least substantially or entirely all of the characteristic.

The term "boat" or "coiled tubing boat" is used herein to refer to a skid or other structure adapted to be installed on, or be formed as part of, a drilling rig, and is not intended to refer to any kind of watercraft.

The foregoing discussion outlines features of several embodiments so that those of ordinary skill in the art may better understand various aspects included within the present disclosure. Those of ordinary skill in the art should appreciate that they may readily use the present disclosure as a basis for designing or modifying other methods, systems, and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. An enclosed coiled tubing boat apparatus, comprising:
   a structural framework;
   a coiled tubing reel and an operatively associated coiled tubing injector; and
   an enclosure that is operatively associated with the structural framework and that surrounds a portion of the coiled tubing reel and a portion of the coiled tubing injector to form the coiled tubing boat apparatus;
   wherein the coiled tubing injector is configured to move within the coiled tubing boat apparatus and wherein the structural framework is adapted to be carried on a drilling rig, and wherein the coiled tubing boat apparatus with the enclosure is configured to movably couple to the drilling rig for movement relative to the drilling rig when moveably coupled to the drilling rig.

2. The coiled tubing boat apparatus of claim 1, wherein and the coiled tubing boat apparatus is configured to move in at least two dimensions relative to the drilling rig.

3. The coiled tubing boat apparatus of claim 2, wherein the coiled tubing boat apparatus is coupled to a structural member layout on the drilling rig.

4. The coiled tubing boat apparatus of claim 2, wherein the coiled tubing boat apparatus is adapted to move between a non-operating, coiled tubing reel exchange position and an operating position, each on the drilling rig.

5. The coiled tubing boat apparatus of claim 4, wherein the non-operating coiled tubing reel exchange position includes a portion of the coiled tubing boat apparatus overhanging a rear of the drilling rig.

6. The coiled tubing boat apparatus of claim 4, wherein the operating position includes the coiled tubing boat apparatus positioned proximate a mast of the drilling rig.

7. The coiled tubing boat apparatus of claim 6, wherein the coiled tubing boat apparatus is adapted to move to a non-operational rig transport location on the drilling rig in which the coiled tubing apparatus is adapted to move laterally relative to the drilling rig to facilitate lowering of the mast of the drilling rig to an at least substantially horizontal position.

8. The coiled tubing boat apparatus of claim 1, further comprising a driller's cabin that includes a plurality of controls to at least operate the coiled tubing injector, and hoist and lower a block of the drilling rig.

9. The coiled tubing boat apparatus of claim 1, wherein the enclosure is arranged to fully enclose both the coiled tubing reel and the coiled tubing injector.

10. The coiled tubing boat apparatus of claim 1, wherein the enclosure comprises separate rooms for the coiled tubing reel and for the coiled tubing injector.

11. A method of modifying an existing drilling rig which comprises:
    installing a plurality of structural members on the existing drilling rig;
    providing a coiled tubing boat apparatus which comprises:
        a structural framework adapted to be associated with the plurality of structural members;
        an enclosure surrounding at least a portion of the structural framework;
        a coiled tubing reel protected within the enclosure; and
        a coiled tubing injector protected within the enclosure;
        wherein the coiled tubing injector moves between a non-operational position within the coiled tubing boat apparatus and an operational position; and
    operatively associating the coiled tubing boat apparatus with the enclosure with the plurality of structural members so that the coiled tubing boat apparatus may move relative to the drilling rig when the coiled tubing boat apparatus is operatively associated with the drilling rig.

12. A method of operating a drilling rig which comprises:
    providing a plurality of structural members on the drilling rig;
    providing a coiled tubing boat apparatus which comprises a structural framework adapted to be associated with the plurality of structural members, the coiled tubing boat apparatus comprising an enclosure and carrying a coiled tubing injector movable within the enclosure of the coiled tubing boat apparatus and carrying a coiled tubing reel within the enclosure of the coiled tubing boat apparatus;
    operatively associating the coiled tubing boat apparatus with the plurality of structural members so that the coiled tubing boat apparatus may move along the plurality of structural members relative to the drilling rig; and
    moving the coiled tubing boat apparatus with the enclosure between an operating position and a non-operational, coiled-tubing-reel exchange position on the drilling rig when the coiled tubing boat apparatus is operatively associated with the drilling rig.

13. The method of claim 12, wherein moving the coiled tubing boat apparatus to the coiled-tubing-reel exchange position comprises moving the coiled tubing boat apparatus so that a portion of the coiled tubing apparatus overhangs a rear of the drilling rig.

14. The method of claim 12, wherein moving the coiled tubing boat apparatus to the operating position comprises moving the coiled tubing boat apparatus proximate a mast of the drilling rig.

15. The method of claim 12, further comprising moving the coiled tubing boat apparatus laterally relative to the drilling rig and on the drilling rig to facilitate lowering of a mast of the drilling rig to be lowered to at least a substantially horizontal position with the coiled tubing boat apparatus on the drilling rig.

16. The method of claim 12, which further comprises controlling a coiled tubing injector and hoisting and lowering of a block of the drilling rig from a driller's cabin in the coiled tubing boat apparatus.

17. A coiled tubing boat apparatus comprising:
    an operatively associated coiled tubing reel and coiled tubing injector;
    wherein the coiled tubing injector is configured to move relative to the coiled tubing reel;
    an enclosure surrounding at least a portion of both the coiled tubing reel and the coiled tubing injector to form the coiled tubing boat apparatus;
    wherein the coiled tubing boat apparatus with the enclosure is integrally coupled with an existing drilling rig and configured to translate in at least two dimensions relative to the drilling rig when the coiled apparatus with the drilling rig.

18. The coiled tubing boat apparatus of claim 17 wherein the at least two dimensions includes longitudinal and lateral movement relative to the drilling rig.

19. The coiled tubing boat apparatus of claim 17, wherein the coiled tubing boat apparatus is supported by a structural framework that is operatively associated with a plurality of structural members connected to the drilling rig;
    wherein the coiled tubing boat is installed on the plurality of structural members.

20. The coiled tubing boat apparatus of claim 18, wherein the coiled tubing boat apparatus is adapted to translate longitudinally relative to the drilling rig so that a portion of the coiled tubing boat apparatus overhangs a rear of the drilling rig in a non-operational position.

21. The coiled tubing boat apparatus of claim 17, which further comprises a driller's cabin that includes a plurality of controls to at least operate the coiled tubing injector, and hoist and lower a block of the drilling rig.

* * * * *